United States Patent
Usuda et al.

(10) Patent No.: US 8,041,381 B2
(45) Date of Patent: Oct. 18, 2011

(54) RADIO NETWORK CONTROLLER AND TRANSMISSION POWER CONTROL METHOD

(75) Inventors: Masafumi Usuda, Tokyo (JP); Anil Umesh, Yokohama (JP); Hidehiro Ando, Yokohama (JP); Takuya Sato, Yokohama (JP); Shinichi Sasaki, Yokosuka (JP); Kouji Makino, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 527 days.

(21) Appl. No.: 12/160,524

(22) PCT Filed: Jan. 10, 2007

(86) PCT No.: PCT/JP2007/050186
§ 371 (c)(1),
(2), (4) Date: Oct. 16, 2008

(87) PCT Pub. No.: WO2007/080901
PCT Pub. Date: Jul. 19, 2007

(65) Prior Publication Data
US 2010/0222094 A1  Sep. 2, 2010

(30) Foreign Application Priority Data
Jan. 10, 2006 (JP) .............................. 2006-002911

(51) Int. Cl.
*H04B 7/00* (2006.01)
(52) U.S. Cl. .... 455/522; 455/69; 455/67.11; 455/67.13; 455/126

(58) Field of Classification Search .................. None
See application file for complete search history.

(56) References Cited

U.S. PATENT DOCUMENTS

| 7,542,775 B2 * | 6/2009 | Sato et al. ............ 455/522 |
| 2005/0143012 A1 * | 6/2005 | Gu et al. ............ 455/67.13 |
| 2007/0010277 A1 | 1/2007 | Sato et al. |

FOREIGN PATENT DOCUMENTS

| JP | 2005-006190 | 1/2005 |
| WO | WO 2004/112282 A1 | 12/2004 |

OTHER PUBLICATIONS

Office Action mailed on Nov. 2, 2010, in Japanese Patent Application Serial No. 2006-002911 (with English Translation).

* cited by examiner

*Primary Examiner* — Tuan Pham
*Assistant Examiner* — Fanghwa Wang
(74) *Attorney, Agent, or Firm* — Oblon, Spivak, McClelland, Maier & Neustadt, L.L.P.

(57) ABSTRACT

A radio network controller includes a block error detection unit configured to receive a data block from the base station and to detect a block error, and a target SIR calculation unit configured to calculate a target SIR based on the detected block error rate. The target calculation unit sets a first time section, which indicates a time section from a detection of the block error to the notification of the target SIR is to the base station when the block error is detected, shorter than a second time section, which indicates a time section from the detection of the block error to the notification of the target SIR to the base station when the block error is not detected.

2 Claims, 3 Drawing Sheets

RADIO NETWORK CONTROLLER AND TRANSMISSION POWER CONTROL METHOD

TECHNICAL FIELD

The present invention relates to a radio network controller and a transmission power control method.

BACKGROUND ART

A CDMA mobile communication system makes it possible to maintain a communication quality at a desired level and to minimize an interference causing to the other users, by performing a transmission power control with a high accuracy. Accordingly, the COMA mobile communication system can increase a radio system capacity. The CDMA mobile communication system includes two steps of a configuration in order to maintain a received SIR (Signal to Interference power Ratio) closer to a target SIR: an inner loop transmission power control and an outer loop transmission power control. In the inner loop transmission power control, a radio base station measures the received SIR and compares the received SIR with the target SIR, and instructs, to a mobile station, to increase or decrease the transmission power by using a transmission power control bit. In the outer loop transmission power control, a radio network controller, which exists as an upper apparatus of the radio base station, measures a reception quality (such as a block error or a block error rate or the like) and instructs, to the radio base station, the target SIR of the radio base station so that the radio base station can satisfy a target quality.

It is preferable that the outer loop transmission power control is performed at every 1[TTI]. For instance, it is ideal that the block error is detected by a CRC and updates the target SIR at every 1[TTI] in the following manner:

```
IF CRC check OK
    Step_down=BLER_target*Step_size
    Sir_target(n)=SIR_target(n-1)-Step_down
ELSE
    Step_up=Step_size-BLER_target*Step_size
    SIR_target(n)=SIR_target(n-1)+Step_up
```

However, when the target SIR is changed at every TTI (Transport Time Interval), control load on the radio network controller may be increased. Further, a bandwidth of an interface between the radio network controller and the radio base station may be largely consumed.

Accordingly, instead of changing the target SIR at every TTI, there has been known a method that sets a predetermined time section in which the target SIR is calculated by using the above-described algorithm at every time section, and notifies the calculated target SIR to the radio base station.

However, when the target SIR calculated based on this method is adopted, the quality is kept deteriorated for the above-described time section, due to the difference between the target quality and the set target SIR. Especially, when a link environment is changed, such as before or after a SHO (Soft HandOver) is performed, the communication quality required based on BLER (block Error Rate) and the target SIR that should be set may be totally different. There has been a problem that the communication quality for this time section can be largely deteriorated at this time, since the target SIR is kept unchanged.

DISCLOSURE OF THE INVENTION

Thus, the present invention has been made in view of the foregoing problems, and an object thereof is to provide a radio network controller and a transmission power control method, which can prevent a deterioration of a radio quality when a link environment is changed, and can reduce a control load on the radio network controller and a load on the bandwidth between the radio network controller and the radio base station.

A first aspect of the present invention is summarized as a radio network controller in which an inner loop transmission power control is adopted between a mobile station and a radio base station, and an outer loop transmission power control is adopted between the radio base station and the radio network controller, and which controls, by comparing a target SIR notified from the radio network controller and a received SIR of a signal received from the mobile station, a radio base station which instructs the mobile station to increase or reduce a transmission power, the radio network controller including; (a) a measurement unit configured to receive a data block from the radio base station and to measure a reception quality of the data block, and; (b) a target SIR calculation unit configured to calculate the target SIR based on the reception quality measured by the measurement unit, wherein (c) the target SIR calculation unit sets a first time section, which indicates a time section from the measurement of the reception quality to the notification of the target SIR to the radio base station when the reception quality is deteriorated, shorter than a second time section, which indicates a time section from the measurement of the reception quality to the notification of the target SIR to the radio base station when the reception quality is not deteriorated.

In the first aspect of the present invention, the measurement unit may detect, as the reception quality, a block error from the received data block, and the target SIR calculation unit may calculate the target SIR based on the detected block error rate, and sets the first time section, which indicates a time section from the detection of the block error rate to the notification of the target SIR to the radio base station when the block error is detected, shorter than the second time section, which indicates a time section from the detection of the block error to the notification of the target SIR to the radio base station when the block error is not detected.

Further, in the first aspect of the present invention, the target SIR calculation unit may calculate the target SIR which is increased by a predetermined value of ΔUP when an error is detected, and to calculate the target SIR which is decreased by a value of ΔDOWN, by using a formula (1) and by setting the target block error rate as BLER_target, when the error is not detected for a predetermined time $N_{CNT}$[TTI].

$$\Delta Down = \frac{\text{BLER\_target}}{1 - \text{BLER\_target}} \cdot \Delta UP \cdot N_{CNT} \qquad \text{formula (1)}$$

A second aspect of the present invention is summarized as a transmission power control method in a communication system in which an inner loop transmission power control is adopted between a mobile station and a radio base station, and an outer loop transmission power control is adopted between the radio base station and a radio network controller, and which includes the radio network controller configured to calculate a target SIR based on an uplink channel quality received from the radio base station, and the radio base station configured to instruct the mobile station to increase or reduce a transmission power by comparing the target SIR notified from the radio network controller and a received SIR of a signal received from the mobile station, the transmission power control method including; (a) receiving a data block from the radio base station and measuring a reception quality; (b) calculating the target SIR based on the measured reception quality; and (c) setting a first time section, which indicates a time section from the measurement of the reception quality to the notification of the target SIR to the radio base station when the reception quality is deteriorated, shorter than a second time section which indicates a time section from the measurement of the reception quality to the notification of the target SIR to the radio base station when the reception quality is not deteriorated.

BEST MODES FOR CARRYING OUT THE INVENTION

Figure 1:
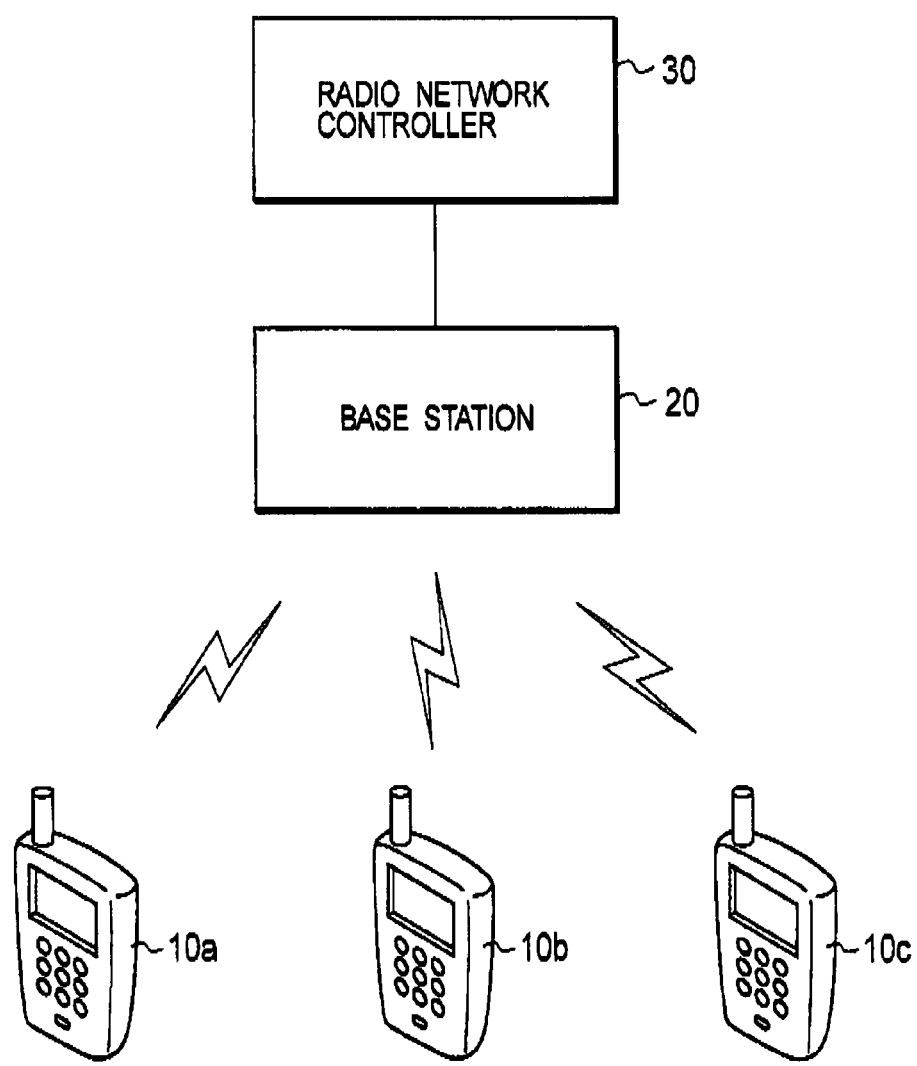
FIG. 1 is a configuration block diagram of a communication system according to an embodiment.
Figure 2:
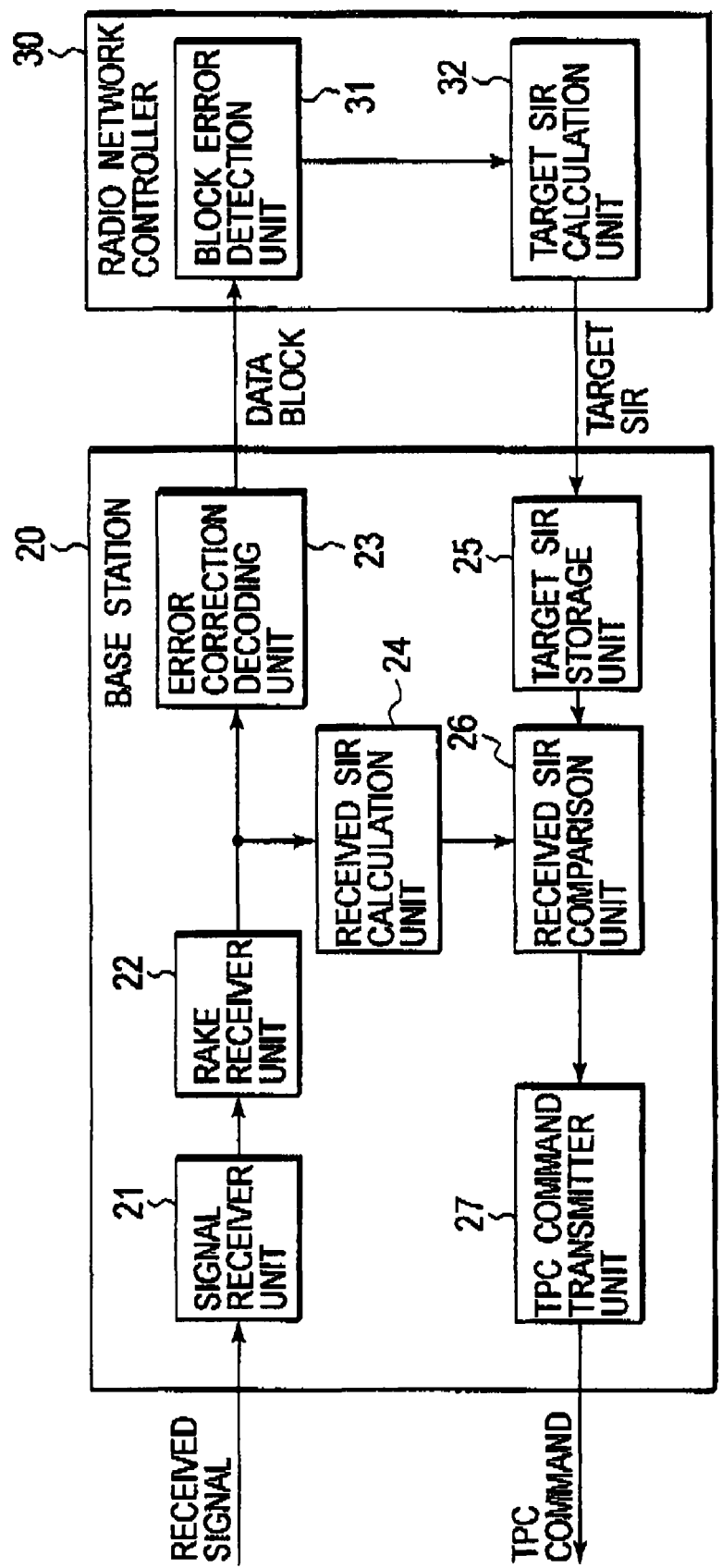
FIG. 2 is a configuration block diagram of a radio network controller and a base station according to the embodiment.

Next, with reference to the accompanying drawings, embodiments of the present invention will be described. In the description of the drawings, the same or similar reference numerals denote the same or similar elements. However, it should be noted that the drawings are schematic.
(Configuration of Communication System)
As shown in FIG. 1, a communication system according to an embodiment includes a base station 20 wirelessly connected to a plurality of mobile stations 10a, 10b, 10c, and a radio network controller 30 controlling the base station 20. Incidentally, although the number of the mobile station performing radio communication with the base station is set to "3" in the present embodiment, the number of the mobile station is not limited to "3".
According to the communication system of the present embodiment, the inner loop transmission power control is adopted between the mobile stations 10a, 10b, 10c, and the base station 20. Further, the outer loop transmission power control is adopted between the base station 20 and the radio network controller 30.
FIG. 2 selectively shows functions relating to an uplink transmission power control of the base station 20 and the radio network controller 30 according to the present embodiment.
The base station 20 includes a signal receiver unit 21, a RAKE receiver unit 22, an error correction decoding unit 23, a received SIR calculation unit 24, a target SIR storage unit 25, a received SIR comparison unit 26, and a TPC command transmitter unit 27.
The signal receiver unit 21 converts a radio signal, which is a signal received from an antenna, into a baseband signal, and transmits to the RAKE receiver unit 22.
The RAKE receiver unit 22 performs a maximum ratio combining by using a despreading and a pilot signal, and extracts a desired user signal.
The received SIR calculation unit 24 calculates a received SIR by using the pilot signal of the desired user signal.
A comparison is made between a notified target SIR and the received SIR. When the received SIR>target SIR as a result of the comparison, "Down" command is generated, and when the received SIR<target SIR as a result of the comparison, "Up" command is generated. Then, the generated command is transmitted to the TPC command transmitter unit 27.

The TPC command transmitter unit 27 transmits the "Down" command or the "Up" command to the mobile station.

On the other hand, the signal on which a RAKE reception is performed is inputted into the error correction decoding unit 23. The error correction decoding unit 23 performs an error correction decoding. The signal on which the error correction decoding is performed is transmitted to the radio network controller 30.

As shown in FIG. 2, the radio network controller 30 includes a block error detection unit 31 and a target SIR calculation unit 32.

The block error detection unit 31 (measurement unit) receives a data block from the base station 20 and measures the reception quality. For instance, the block error detection unit 31 performs a block error detection by using the CRC (Cyclic Redundancy Check).

The target SIR calculation unit 32 calculates the target SIR based on the reception quality measured by the block error detection unit 31 (measurement unit). For instance, the target SIR calculation unit 32 calculates the target SIR based on the block error detected by the block error detection unit 31.

Further, the target SIR calculation unit sets a first time section, which indicates a time section from the measurement of the reception quality to the notification of the target SIR to the base station 20 when the reception quality is deteriorated, shorter than a second time section, which indicates a time section from the measurement of the reception quality to the notification of the target SIR to the base station 20 when the reception quality is not deteriorated. For instance, the target calculation unit 32 sets the first time section, which indicates a time section from a detection of the block error to the notification of the target SIR is to the base station 20 when the block error is detected, shorter than a second time section, which indicates a time section from the detection of the block error to the notification of the target SIR to the base station 20 when the block error is not detected.

Moreover, when the error is detected, the target SIR calculation unit 32 increases the target SIR by a predetermine value of $\Delta$UP, and instantly notifies the increased target SIR to the base station 20.

On the other hand, when the error is not detected, the target SIR calculation unit 32 suspends the detection for a predetermined time $N_{CNT}$[TTI], and when the error is not detected for the predetermined time $N_{CNT}$[TTI] the target SIR calculation unit 32 calculates the target SIR which is decreased by a value of $\Delta$DOWN, based on the following formula (1)

$$\Delta Down = \frac{\text{BLER\_target}}{1 - \text{BLER\_target}} \cdot \Delta UP \cdot N_{CNT} \qquad \text{formula (1)}$$

Figure 3:
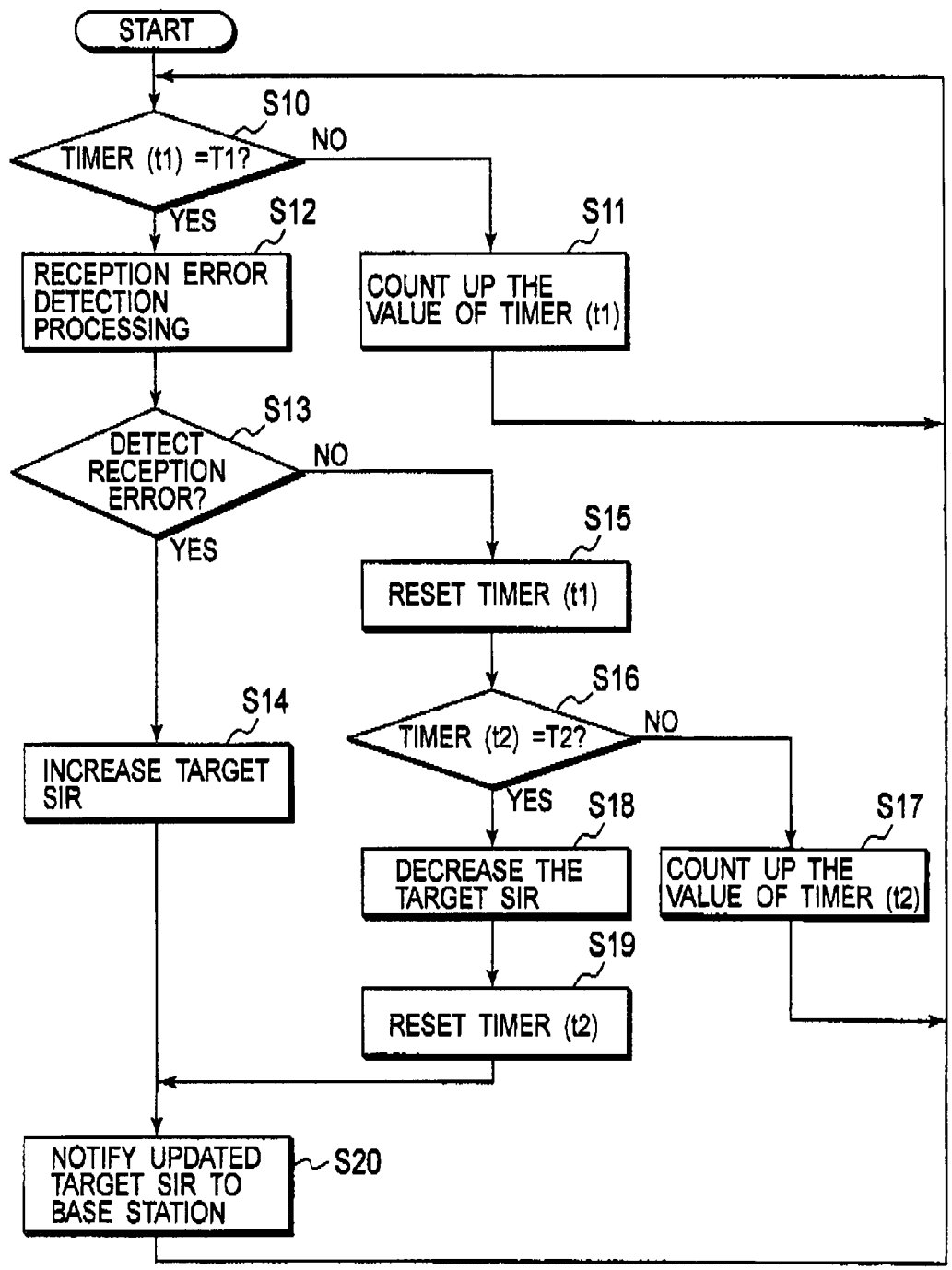
FIG. 3 is a flowchart showing a transmission power control method according to the embodiment.

Then, the target SIR calculation unit 32 notifies the decreased target SIR to the base station 20.
(Transmission Power Control Method)
Then, with reference to FIG. 3, a description will be given for the transmission power control method according to the present embodiment. FIG. 3 is a flowchart showing an operation relating to the outer loop transmission power control of the radio network controller according to the present embodiment. Here, the description will be given for an example in which the block error rate is used as the reception quality and the target SIR is calculated based on the error detection.

Here, t1 and t2 respectively indicates a timer which determines whether or not a CRC error is existed, and a timer which determines a timing for notifying the target SIR which is decreased by the value of ΔDOWN when the CRC error is not detected. The t1 and the t2 respectively indicates "t1=0" and "t2=0" at the beginning.

Further, a time section T1 and a time section T2 are determined to respectively indicate a period in which the CRC error is determined, and a period in which a "Down" command is transmitted. T1 may determine whether or not the CRC error is existed at every frame based on a TTI. Alternatively, the load may be reduced based on "number·[TTI]". T2 may enhance an accuracy of the transmission power control by frequently performing the "Down" based on the "number· [TTI]". Alternatively, the load on the Radio network Controller (RNC) may be minimized by infrequently performing the "Down" based on "several hundred·[TTI]".

In FIG. 3, the radio network controller counts up a value of the timer (t1) till the t1 indicates T1 (S11). When the t1 indicates T1 (S10), the radio network controller performs the CRC error detection (S12).

When the error is detected (S13), the radio network controller 30 increase the target SIR by a predetermined step of ΔUP (S14), and notifies the increased target SIR to the base station 20 (S20). Then, the processing moves back to the beginning.

On the other hand, when the CRC error is not detected (S13), the radio network controller resets the timer (t1) (S15). Then, when the t2 is not reached at T2 (S16), the radio network controller counts up the value of the timer (t2) (S17). Then, the processing moves back to the beginning.

When the t2 reaches at T2 (S18), the radio network controller decreases the target SIR by the value of ΔDOWN (S18), and resets the timer (S19). Then, the radio network controller notifies the decreased target SIR to the base station 20 (S20), and the processing moves back to the beginning.

(Operation and Effect)

According to the radio network controller 30 and the transmission power control method of this embodiment, it is possible to set the first time section, which indicates the time section from the measurement of the reception quality to the notification of the target SIR to the radio base station when the reception quality is deteriorated, shorter than the second time section, which indicates the time section from the measurement of the reception quality to the notification of the target SIR to the radio base station when the reception quality is not deteriorated. In other words, it is possible to prevent the deterioration of the radio quality when the link environment is changed, and to reduce the control load on the radio network controller 30 and the bandwidth load between the radio network controller 30 and the base station 20, by notifying the target SIR promptly when the reception quality is deteriorated and the target SIR is required to be increased, and by notifying the target SIR after an interval when the target SIR is required to be decreased.

Further, according to the present embodiment, the block error rate is used as the communication quality, and it is possible to set the first time section, which indicates the time section from the error detection to the notification of the target SIR to the radio base station when the block error is detected, shorter than the second time section, which indicates the time section from the error detection to the notification of the target SIR to the radio base station when the block error is not detected. Thus, by calculating the target SIR based on the block error rate, it is possible to detect the deterioration of the radio quality more accurately.

In addition, it is preferable that the target SIR which is increased by the predetermined value of ΔUP is calculated when the error is detected, and the target SIR which is decreased by the predetermined value of ΔDOWN is calculated when the error is not detected for the predetermined time $N_{CNT}$[TTI], by using the above-described formula (1).

Other Embodiment

The present invention has been set forth with reference to the aforementioned embodiments. However, it should not be understood that the descriptions and the drawings constituting a part of this disclosure limit the present invention. It is apparent to those skilled in the art that various alternatives, modifications, and practices can be achieved based on this disclosure.

For instance, although the description was given for an example that the block error detection unit 31 detects the block error in order to measure the reception quality, a bit error or the like may be detected other than the block error. In such case, the target SIR calculation unit 32 calculates the target SIR based on the detected bit error rate or the like.

As described above, the present invention has been set forth in detail using the above embodiment. However, it is apparent to those skilled in the art that the present invention is not limited to the embodiments described in this specification. Variations or modifications can be made therein without deviating from the purpose and the scope of the present invention. Accordingly, the description of the above embodiments in this specification aims to explain with examples, and does not include any restrictive meaning.

INDUSTRIAL APPLICABILITY

As has been described above, the present invention makes it possible to provide a radio network controller and a transmission power control method, which can prevent a deterioration of a radio quality when a link environment is changed, and can reduce a control load on the radio network controller and a load on the bandwidth between the radio network controller and the radio base station.

The invention claimed is:

1. A radio network controller in which an inner loop transmission power control is adopted between a mobile station and a radio base station, and an outer loop transmission power control is adopted between the radio base station and the radio network controller, and which controls, by comparing a target SIR notified from the radio network controller and a received SIR of a signal received from the mobile station, a radio base station which instructs the mobile station to increase or reduce a transmission power, the radio network controller comprising:

a measurement unit configured to receive a data block from the radio base station and to measure a reception quality of the data block; and a target SIR calculation unit configured to calculate the target SIR based on the reception quality measured by the measurement unit, wherein, the target SIR calculation unit sets a first time section, which indicates a time section from the measurement of the reception quality to the notification of the target SIR to the radio base station when the reception quality is deteriorated, shorter than a second time section, which indicates a time section from the measurement of the reception quality to the notification of the target SIR to the radio base station when the reception quality is not deteriorated, the measurement unit detects, as the reception quality, a block error from the received data block, the target SIR calculation unit calculates the target SIR based on the detected block error rate, and sets the first time section, which indicates a time section from the detection of the block error rate to the notification of the target SIR to the radio base station when the block error is detected, shorter than the second time section, which indicates a time section from the detection of the block error to the notification of the target SIR to the radio base station when the block error is not detected, and the target SIR calculation unit is configured to calculate the target SIR which is increased by a predetermined value of ΔUP when an error is detected, and to calculate the target SIR which is decreased by a value of ΔDOWN, by using a formula (1) and by setting the target block error rate as BLER_target, when the error is not detected for a predetermined time $N_{CNT}$[TTI]

$$\Delta Down = \frac{\text{BLER\_target}}{1 - \text{BLER\_target}} \cdot \Delta UP \cdot N_{CNT}. \qquad \text{formula (1)}$$

2. A transmission power control method in a communication system in which an inner loop transmission power control is adopted between a mobile station and a radio base station, and an outer loop transmission power control is adopted between the radio base station and a radio network controller, and which comprises the radio network controller configured to calculate a target SIR based on an uplink channel quality received from the radio base station, and the radio base station configured to instruct the mobile station to increase or reduce a transmission power by comparing the target SIR notified from the radio network controller and a received SIR of a signal received from the mobile station, the transmission power control method comprising:

receiving a data block from the radio base station and measuring a reception quality;

calculating the target SIR based on the measured reception quality; and setting a first time section, which indicates a time section from the measurement of the reception quality to the notification of the target SIR to the radio base station when the reception quality is deteriorated, shorter than a second time section which indicates a time section from the measurement of the reception quality to the notification of the target SIR to the radio base station when the reception quality is not deteriorated, wherein, the receiving includes detecting, as the reception quality, a block error from the received data block, the target SIR calculating calculates the target SIR based on the detected block error rate, and sets the first time section, which indicates a time section from the detection of the block error rate to the notification of the target SIR to the radio base station when the block error is detected, shorter than the second time section, which indicates a time section from the detection of the block error to the notification of the target SIR to the radio base station when the block error is not detected, and the target SIR calculating calculates the target SIR which is increased by a predetermined value of ΔUP when an error is detected, and to calculate the target SIR which is decreased by a value of ΔDOWN, by using a formula (1) and by setting the target block error rate as BLER_target, when the error is not detected for a predetermined time $N_{CNT}$[TTI]

$$\Delta Down = \frac{\text{BLER\_target}}{1 - \text{BLER\_target}} \cdot \Delta UP \cdot N_{CNT}. \qquad \text{formula (1)}$$

* * * * *